March 1, 1960  A. C. ERICKSON ET AL  2,926,360
BATHTUB SAFETY CONTROL SYSTEM
Filed July 28, 1958

INVENTOR.
Alfred C. Erickson
Eben Feenstra
Ralph Cohen
By William J. Ruano
ATTORNEY.

2,926,360

BATHTUB SAFETY CONTROL SYSTEM

Alfred C. Erickson, Eben Feenstra, and Ralph Cohen, Aliquippa, Pa.

Application July 28, 1958, Serial No. 751,222

3 Claims. (Cl. 4—173)

This invention relates to a bathtub electrical control system for automatically shutting off the hot and cold water and for opening the drain in the event that a bather is disabled and cannot perform these functions because of fainting, slipping and falling unconscious, or because of such an onrush of abnormally hot water as to make it impossible to reach the valves.

An outstanding disadvantage of conventional bathtub spigot valves is that often times a bather is unable to turn off the spigot or open the drain. There have been many instances in which bathers have drowned on this account because they become unconscious after slipping and falling, or in some instances, the bather became scaled because of a sudden onrush of very hot water, as often occurs in hotels, or as a result of accidental bumping against the hot water spigot valve.

An object of the present invention is to provide a novel, automatic control system for bathtubs which is devoid of the above-named disadvantages and which will offer complete protection in the event that the bather is unable, for one reason or another, to manually control the hot and cold water valves and the drain outlet.

A further object of the present invention is to provide an automatic electrical control system for controlling the hot and cold water valves and the drain spigot of a bathtub and which will also give a visual as well as an audible signal to outsiders in the case of disablement of the bather so that help may be summoned.

Other objects and advantages of the invention will become more apparent from a study of the following description taken with the accompanying drawing, wherein.

Figure 1:
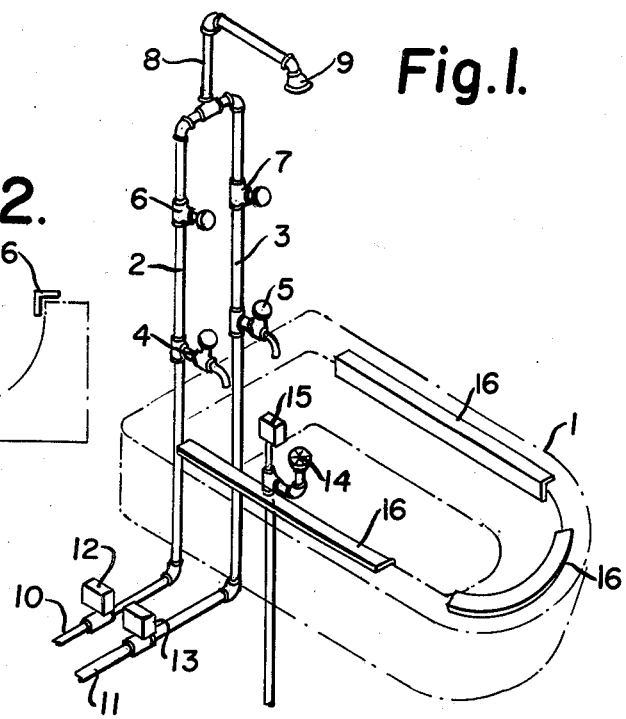
Fig. 1 is a perspective view of a bathtub showing somewhat schematically an electrical control system for automatically controlling hot and cold water valves and the drain outlet of a bathtub in accordance with the present invention.
Figure 2:
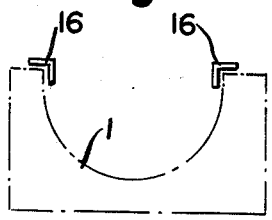
Fig. 2 is a transverse or end view of the bathtub showing the location of the touch bar control switch.

Referring more particularly to the drawing, numeral 1 denotes, in dot and dash outline, a bathtub of any conventional type, and numerals 2 and 3 denote the hot and cold water supply pipes for the tub. The flow of hot and cold water to the tub is controlled by the manually operated valves 4 and 5, respectively, and the flow of the water to the shower is controlled by manually controlled valves 6 and 7, respectively, which enables variation of the temperature of the water which flows into pipe 8 and outwardly through the shower 9. Instead, a single pair of valves may be used with a switching control valve to selectively effect flow from the tub spigot or shower, as well known in the art. Within the supply pipes 10 and 11 for the hot and cold water, respectively, there are inserted solenoid operated valves 12 and 13, respectively, which valves are normally open but upon energization, close the supply of hot and cold water to pipes 2 and 3.

The drain plug 14 leads to a T-connection which is connected to a solenoid operated valve 15 which is so arranged that the drain plug is normally closed, but upon energization, becomes opened. Solenoid valves which are either maintained normally closed by a spring and opened by energization of the solenoid coil, or are normally open and automatically closed by energization of the coil are well known in the art, therefore, further description of the details thereof is deemed unnecessary.

Figure 3:
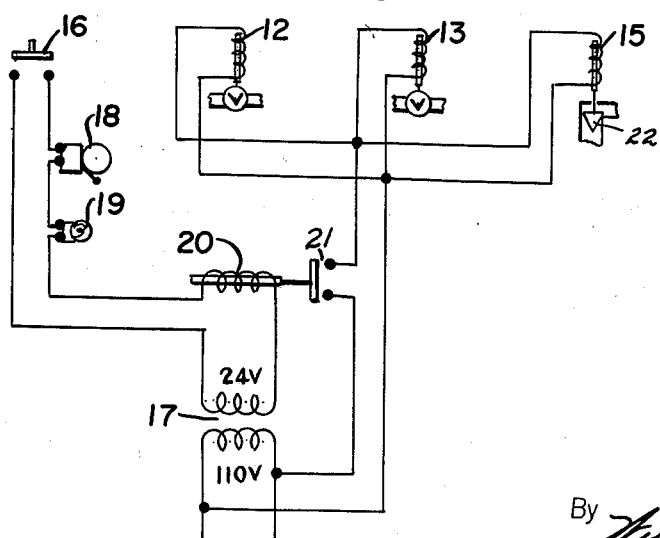
Fig. 3 is a schematic electrical diagram showing the essential features of the electrical system for automatically controlling the hot and cold water and drain valves.

Disposed about the inner periphery of the top portion of the bathtub there are a plurality of touch bars or control switches 16 which are kept normally separated from the edge of the bathtub by means of springs (not shown) which normally keep the switches in the open position as shown in Fig. 3. These switches are all connected in parallel and, in some instances, may comprise a continuous flexible strip with metal contacts underneath, or a plurality of strips as shown in Fig. 1.

In operation, the bather will control either the bathtub hot water valves 4 and 5 manually, or the shower valves 6 and 7, manually in the ordinary manner so as to control the amount of hot and cold water flowing into the bathtub from the spigots or from the shower 9. During this time solenoid valves 12 and 13 are normally de-energized and are normally open and the drain plug is normally closed because of deenergization of its solenoid valve 15.

In the event, however, the bather slips on the tub and strikes his head against some part so as to become unconscious, or faints or is for any reason rendered disabled, he will normally slump against one of the touch bars or control switches 16 and in so doing the touch bar 16 will close a circuit, as shown in Fig. 3, so as to complete a circuit through the bell alarm 18, pilot light 19 and relay coil 20 in a 24 volt system, which system is fed by the 110 volt source through transformer 17, as shown. Bell alarm 18 and pilot light 19 may be located in some other room, such as in the registration office of a hotel or other control point that is constantly attended by supervisory personnel. Thus upon energization of relay coil 20, normally kept open by a spring (not shown) or by gravity, the switch 21 becomes closed, thereby completing a circuit directly from the 110 volt line through each of the solenoid valve coils 12, 13 and 15, connected in parallel to such line. Thus the hot and cold water solenoids 12 and 13 will become energized and thereby shut off the supply of hot and cold water which would otherwise flow through pipes 2 and 3, thus shutting off the water flow from the spigots 4 and 5 or from shower 9. Energization of solenoid coil 15 will effect opening of the drain plug 22 so that the water already in the tub will drain out and thereby not cause drowning of the bather. Such controls not only protect a disabled bather but are also very useful for all bathers. For instance, in hotels, oftentimes through accident, or because of the faulty hotel hot and cold water systems, wide fluctuations occur in the hot water temperature, sometimes to the extent of scalding a bather since he is unable to approach the controls because of the hot shower spray, therefore he is often times severely burned. However, by the present control system, merely touching one of the touch bars or control switches 16 would immediately stop the flow of hot water and thereby prevent scalding.

The present invention is particularly useful in homes for the aged, hotels, hospitals and the like.

It will be readily apparent to those skilled in the art that other electrical control systems may be devised, such as those having interlocking control switches and the like, for accomplishing substantially the same results as described above, but which are in the purview and scope of the present invention. Likewise the disposition of the touch bars 6 may be also somewhat different, perhaps extended throughout the entire periphery of the bathtub, or perhaps placed on top of the bathtub, or actually built into the top portion of the bathtub as desired.

Thus it will be seen that we have provided a highly efficient automatic control system for automatically turning off hot and cold water and opening the drain plug of a bathtub in the event that the bather becomes disabled, either through fainting spells or accident or for any other reason, and wishes to disconnect the hot and cold water supply and open the drain; furthermore, we have provided an efficient control system for bathtubs which will not only afford protection but which will give an audible alarm as well as a visual signal to others to summon help to the disabled bather so that he may not lay unconscious for long periods of time without attention.

While we have illustrated and described a single specific embodiment of our invention, it will be understood that this is by way of illustration only, and that various changes and modifications may be made within the contemplation of our invention and within the scope of the following claims.

We claim:
1. In combination with a bathtub, a control switch disposed along the upper and inner peripheral portion of the bathtub, a solenoid valve which is normally open for normally allowing the flow of hot water therethrough into the tub, a second solenoid valve which is normally open for allowing the flow of cold water therethrough into the tub, electrical control system including said valves and said switch which, upon closing of said control switch, will operate said valves so as to stop the flow of hot and cold water into said tub.

2. A bathtub control system as recited in claim 1 together with a drain plug in said bath tub including a solenoid valve which normally closes said plug but which, upon closing of said switch will effect opening of said plug.

3. A bathtub control system as recited in claim 2, together with an alarm operated in response to closing of said switch for summoning help.

References Cited in the file of this patent

UNITED STATES PATENTS

| | | |
|---|---|---|
| 802,953 | Waterman | Oct. 24, 1905 |
| 2,180,790 | Brummett | Nov. 21, 1939 |